United States Patent Office 3,403,095
Patented Sept. 24, 1968

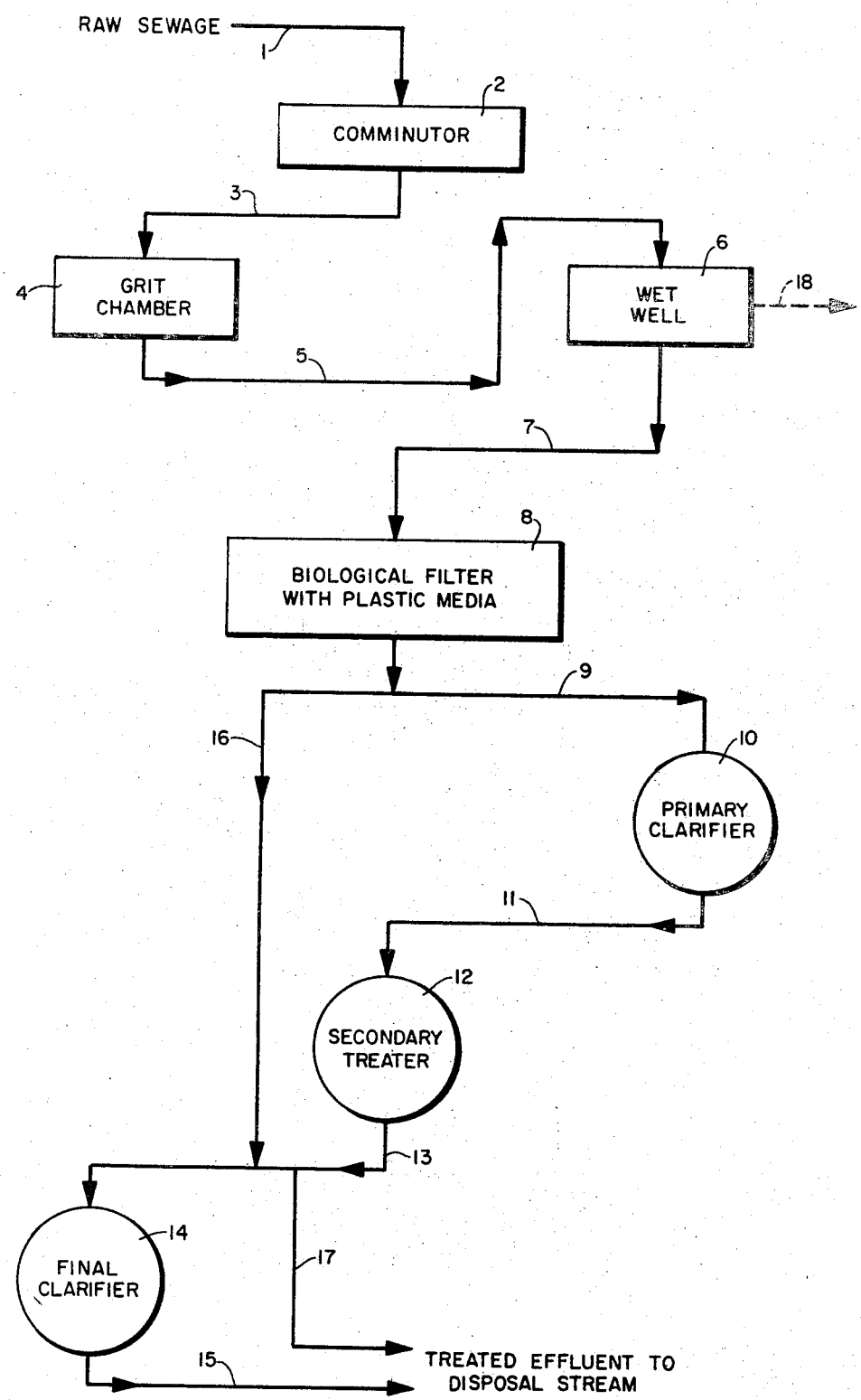

3,403,095
SEWAGE TREATMENT PROCESS
AND APPARATUS
Philip N. J. Chipperfield, Brixham, England, and Joseph H. Benton, Baton Rouge, La., assignors of one-half each to Ethyl Corporation, New York, N.Y., a corporation of Virginia, and Imperial Chemical Industries Limited, London, England, a company of Great Britain
Filed Oct. 24, 1966, Ser. No. 596,714
10 Claims. (Cl. 210—17)

The present invention relates to a process for the treatment of sewage. More particularly the present invention relates to the treatment of sewage which has been diluted by rain water.

In normal sanitary engineering practices a sewage treatment plant is designed with a capacity of two to three times the normal dry weather flow. However, in many cities of the world and particularly those located close to the shorelines of large lakes and oceans the sanitary sewers are joined to and coupled with the storm sewer system. In cities having such sewage collecting systems it is not unusual for the total flow of storm water diluted sewage to exceed five to ten times that which normally occurs in dry weather. During such times of high dilution from storm water it is common practice to by-pass the treatment system and send the major portion of the diluted raw sewage directly to the disposal stream without any treatment whatsoever. This is necessitated by the extreme overload which would be experienced by the treating facility should all the diluted raw sewage be sent through the treating system. This is highly undesirable practice in that it increases the biological oxygen demand in the receiving stream and additionally presents health problems and creates obnoxious odors.

To date it has been uneconomical to build conventional sewage treatment plants of a size sufficient to handle storm diluted raw sewage because of the tremendous cost and land area required for installation of such conventional plants.

Thus there has been a continuing need for a sewage treatment system which can handle storm water diluted raw sewage without the expense and land problems associated with the installation of conventional type systems. Additionally there has been a need for more efficient biological treatment of sewage for incorporation into existing conventional sewage treatment plants wherein the treating plant capacity has been exceeded by the rapid growth of the served community. Many such installations exist in this country today due to the rapid growth of urban populations.

Additionally the growing demand for water in our present society requires that stringent steps be taken in order to conserve the supply and increase the purity of our surface waters. Our ever-expanding population and industrial requirements for water will require that our surface waters be reused a number of times in many cases. Thus there is an outstanding need for processes which will more effectively treat sewage in order that pollution of our surface streams may be reduced.

It is an object of the present invention to provide a sewage treatment process of greater efficiency than the processes presently available.

It is a further object of the present invention to provide a sewage treatment process capable of effectively treating storm diluted sewage.

It is also an object of the present invention to provide a sewage treatment process which produces a humus having a high settling rate.

It is a still further object of the present invention to provide a process for the treatment of sewage which process has the ability to handle unsettled raw screened sewage without plugging.

Broadly the process of the present invention utilizes a biological filter packed with a plastic medium which has a capacity at least equal to the total flow of the storm diluted sewage entering the sewage treatment plant. The plastic filled biological filter is followed by a primary clarifier, a secondary treater and a final clarifier. In normal dry weather the entire flow of sewage passes through the plastic media packed biological filter into the primary clarifier, then to the secondary treater, then to a final clarifier with the treated effluent being passed to the disposal stream from the final clarifier. In times of rainfall where raw sewage is diluted with storm water the present process passes a portion of the diluted sewage from the catch basin of the plastic packed biological filter directly to the final clarifier where the sewage is settled and then passed directly to the effluent receiving stream. Additionally the total normal flow stream from the secondary treater is diverted from the final clarifier and passed directly to the effluent disposal stream. In this manner treating efficiencies (measured in terms of biological oxygen demand, B.O.D., of the effluent) of greater than eighty percent are experienced whereas in normal overload times the treatment efficiency of a conventional biological treatment clarifier system falls to the level of about forty percent efficiency.

More specifically the process of the present invention is carried out to effectively treat a flowable organic containing waste material stream by-passing the total flow of the waste material through a chamber containing a medium of plastic material having on its contacting surface a biological growth. One portion of the discharge stream from the plastic grid containing chamber is then passed through a primary clarifier to remove a portion of the solids therefrom. The discharge stream from the primary clarifier is then passed through a secondary treater containing a biological growth. The discharge stream from the secondary treater is then passed to the final disposal stream. The other portion of the discharge stream from the chamber containing the plastic grid material is passed through a final clarifier. The discharge stream from the final clarifier is then sent to the final disposal stream.

An additional aspect of the foregoing process is the use of weir flow arrangements, valves or similar devices in order to divert excess flow from the biological filter packed with plastic media into the final clarifier. Also a weir flow arrangement, valves or similar devices may be provided in the secondary treater to divert its flow to the final disposal stream when flow from the plastic media chamber is being diverted to the final clarifier.

Referring now to the drawing the raw sewage from a municipal sewage collection system when treated by the process of the present invention may first be acted on by a comminutor. The raw sewage which enters through inlet line 1 is acted on by the comminutor 2 and then passed through flow line 3 to a grit chamber 4. In the grit chamber the sand and other dense inorganic solids are settled out and removed by conventional solids removable equipment. From the grit chamber the raw sewage is carried by means of flow line 5 into a wet well 6 where the sewage is kept in an agitated state for distribution to the treating system. A flow line 7 carries the raw sewage to a chamber 8 which is packed with a plastic filter media having a high surface area coupled with a high open area for flow of liquid and solid sewage therethrough.

The plastic filter media with which chamber 8 is packed should meet a number of requirements in order to be satisfactory for operation in the process of the present invention. The filter should be biologically inert, i.e., neither attacked by nor inhibiting the growth of the biological organisms which effect the treatment of sewage. Additionally the plastic surface of the filter media should offer the biological film a good footing where it can grow satisfactorily. The structural configuration of plastic material employed in the plastic packing must be such as to promote the uniform spread of liquid to all parts of the available surface of the packing media. The packing media should provide for the flow of liquid thereover in as thin a film as possible in order to enable adequate oxygen transfer to take place from the air to the wet biological growth. Additionally the packing must provide adequate void space to permit a steady supply of air to be circulated to the biological growth. Additionally the void space must allow free passage of the treated effluent downwards and all organic solids must be shed from the contacting surfaces rapidly by the flushing action of the liquid. The plastic material employed must be chemically stable, in other words it should not degrade with age or in the presence of small quantities of solvents and organic chemicals. Further, the packing material should be mechanically stable in order that it can support its own weight and a considerable added weight of effluent and biological growth. Also the plastic material should have a cost that will not rule it out on economic grounds alone.

A plastic packing for the biological filter chamber 8 which meets the foregoing requirements admirably is the packing marketed under the tradename "Flocor." The "Flocor" plastic packing consist of alternating plain sheets and vacuum formed corrugated sheets of thin polyvinyl chloride rigid material built to form standard units which are four feet long by two feet wide by two feet high. Each unit forms a strong, rigid highly braced beam structure capable of bearing heavy loads. The corrugations in each sheet are double corrugations in order that there can be no free fall of liquid through the vertical channels and additionally when liquid is applied over a wide range of application rates it will flow in a thin film over the corrugated surfaces without channeling and without collecting as drops at the angles of the corrugations. In the construction of the preferred "Flocor" packings the corrugated and plain sheets are bonded together by means of male and female studs with the former passing through locating holes in the plain sheets. The male and female studs are firmly cemented to the PVC base by an adhesive to form a strong chemically resistant joint. Additional strength is obtained in this plastic packing media by cementing the upper and lower edges of the panels. The weight of a fabricated unit of "Flocor" packing is about two pounds to the cubic foot and the surface area per unit volume is twenty-seven square feet.

In the preferred installation the units or packs are stacked one above the other with each layer being placed at right angles to the one below. Normally ten foot depths or more can be used without any intermediate support. However, if intermediate support is desired simple narrow parallel beams spaced eighteen inches to two feet apart may be utilized for supporting much higher stacks of plastic filter media. Further details of the construction of the "Flocor" plastic packing media are found in British Patent 962,432 and U.S. Patent 3,260,511, the disclosures of which are incorporated herein by reference. The performance of "Flocor" plastic media and the biological treatment of waste has been determined from experimental installations which have been operating for some time. For a fuller disclosure of the use and efficiency of plastic media in the biological treatment of sewage and industrial waste reference is made to an article entitled, "The Use of Plastic Media in the Biological Treatment of Industrial Waste," appearing in The Surveyor and Municipal Engineer, No. 3846, page 30, Feb. 19, 1966. Additional experimental data developed using "Flocor" plastic packing is reported in the paper, "Experiences in Great Britain by Imperial Chemical Industries, Limited, With Plastic Filter Media" presented by Dr. P. N. J. Chipperfield of the Brixham Research Laboratory, Paints Division of Imperial Chemical Industries, Ltd. at the annual conference of the Water Pollution Control Federation held at Kansas City, Mo., on Monday, Sept. 25, 1966.

In times of normal flow, i.e., in dry weather when the capacity of the sewage treatment system is not being exceeded the entire flow from the biological filter packed with plastic media will pass through flow line 9 to primary clarifier 10. Primary clarifier 10 will consist of a vessel of sufficient cubic content to provide the residence time required to allow suspended solids of certain finite sizes to settle and be drawn off. Additionally a large surface area will be provided as well as a long overflow weir, all designed to settle the suspended solids.

The flow from the primary clarifier passes through flow line 11 to secondary treater 12. Secondary treater 12 consists of a conventional vessel packed with crushed rock of standard size carrying a biological culture which is effective to reduce the biological oxygen demand of the sewage. Alternately this secondary treatment can be other processes such as "activated sludge" or "extended aeration."

In normal dry weather times the entire outflow from the secondary treater 12 will pass through flow line 13 into the final clarifier 14. The final clarifier vessel is one of conventional size and construction which permits the final settling of solids and humus material from the treated effluent before it is finally passed to the waste disposal stream. The finally treated effluent passes through flow line 15 to the disposal stream which carries the effluent away. The preferred construction of the final clarifier is similar to the primary clarifier described above.

In times of rainfall when the storm water diluted raw sewage exceeds the capacity of the conventional primary clarifier 10, the secondary treater 12 and the final clarifier 14 according to the process of the present invention by-passes a portion of the treated effluent from the collection basin of the plastic packed filter chamber 8 through line 16 into the final clarifier 14. This is permissible since the plastic packed filter chamber 8 has the capacity to pass sewage containing a substantial quantity of solid material. However, the presence of solid material in the fluid flowing over the plastic packed filter in chamber 8 does not reduce the biological effectiveness of the plastic packed filter to effectively treat the organic waste material to reduce the biological oxygen demand. In fact a significant feature of the incorporation of the biological filter utilizing the plastic packing media in the process of the present invention resides in the effectiveness of the preferred filter material to convert the dissolved organic matter in the sewage into humus. The humus from this filter has a high settling rate which enhances the capacity of the present sewage treatment system. Due to the effectiveness of the plastic packed filter chamber 8 coupled with the settling achieved in the final clarifier 14 a substantial portion of the storm diluted treated sewage may be passed through flow line 16, settled in the final clarifier 14 and then let out effluent discharge line 15 to the disposal stream.

During these times of overload to the sewage system a weir arrangement may be provided in the outflow line 13 of secondary treater 12 to by-pass all the flow from the secondary treater 12 through line 17 directly to the effluent disposal stream.

Optionally, instead of a weir arrangement utilized in the control of excess flow from the plastic packed chamber 8 through line 16 a valve (not shown) may be installed in line 16 and controlled by flow in line 9. The flow from the secondary treater 12 through line 13 may be by-passed to line 17 by means of a valve (not shown) installed between these lines which is controlled by the flow in line 16 so that the total flow entering final clarifier 14 from line 13 and 16 does not exceed the rated capacity of clarifier 14.

In general the process of the present invention provides a treatment of storm diluted raw sewage which is from about one and one half to about two times as effective, based on B.O.D. removal, as the conventional sewage treatment wherein a portion of the storm diluted raw sewage is by-passed directly to the disposal stream.

Based on standard design utilized for a primary clarifier 10, secondary treater 12, and final clarifier 14 an exemplary calculation has been made for a sewage treatment of rainfall diluted raw sewage for a city of 7,500 population. The following table presents data calculated from the standard design criteria employed for the biological filter utilizing the preferred "Flocor" plastic media together with the known treating efficiencies of standard design primary clarifiers, secondary treaters and final clarifiers.

The table provides a comparison of sewage treatment with and without the incorporation of the plastic filter treating chamber together with the by-pass lines utilized in the process of the present invention. In the comparison the raw sewage overload for the conventional sewage system is discharged in a completely untreated state directly to the final disposal stream through line 18 shown in a dotted line on the drawing.

SEWAGE TREATMENT EFFICIENCY COMPARISON DURING RAINFALL CITY OF 7,500 POPULATION

| Flow point | With plastic media biological filter | Without plastic media biological filter |
|---|---|---|
| 1—Raw sewage inflow: | | |
| Flow, m.g.d | [1] 5.2 | 5.2 |
| BOD, p.p.m | 33 | 33 |
| BOD, lbs./day: | | |
| Dissolved (60%) | 864 | 864 |
| Suspended (40%) | 576 | 576 |
| Total | 1,440 | 1,440 |
| 18—Raw sewage overload to disposal stream: | | |
| Flow, m.g.d | | 2.6 |
| BOD, lbs./day: | | |
| Dissolved | | 432 |
| Suspended | | 288 |
| Total | | 720 |
| 17—Secondary treater flow bypassed to disposal stream: | | |
| Flow, m.g.d | 2.6 | |
| BOD, lbs./day: | | |
| Dissolved [2] | 10 | |
| Suspended [2] | 13 | |
| Total [2] | 23 | |
| 15—Final clarifier effluent to disposal stream: | | |
| Flow, m.g.d | 2.6 | 2.6 |
| BOD, lbs./day: | | |
| Dissolved | [3] 96 | [4] 43 |
| Suspended | [3] 0 | [4] 0 |
| Total | [3] 96 | [4] 43 |
| Total Treatment: | | |
| BOD remaining, lbs./day: | | |
| Dissolved | 106 | 475 |
| Suspended | 13 | 288 |
| Total | 119 | 763 |
| Percent removal | 92 | 47 |

[1] Flow assumed at 6 times normal (0.87), three times normal treated other 50% bypassed.
[2] Treatment assumed to remain constant in secondary treater from 0.87 to 2.6 m.g.d.: 90% of dissolved solids, 15% conversion to humus.
[3] Treatment on plastic grid media assumed to remain substantially constant during periods of storm water flow between 0.87 and 5.2 MGD: 0% suspended, 80% dissolved, 40% conversion to humus.
[4] Treatment assumed to remain constant in primary and final clarifier from 0.87 to 2.6 MGD: 0% of dissolved solids, 100% of suspended solids, 40% of total.

From the foregoing it can be seen that the process of the present invention provides a sewage treatment system which is capable of treating storm water diluted raw sewage at six to ten times the conventional flow rates in a most effective manner. The present process utilizes the unique features of the prefered plastic filter media, i.e., (1) the ability to pass flows of six to ten times normal for a short period of time without significant loss of treatment efficiences such as occurs in conventional design, and (2) a higher conversion of dissolved organic matter to humus coupled with a higher humus settling rate, and (3) the ability to handle unsettled raw comminuted sewage without plugging.

The foregoing disclosure and description of the process of the present invention is illustrative and exemplary thereof, and in light thereof modifications will be apparent to those skilled in the art. Therefore, the present invention is to be limited only by the scope of the appended claims.

What is claimed is:

1. In a method of treating flowable organic-containing waste material the improvement comprising:
   (a) passing the total flow of said waste material through a chamber containing a grid of plastic material having on its contacting surface a biological growth;
   (b) passing one portion of the discharge stream from said chamber through a primary clarifier to remove a portion of the solids therefrom;
   (c) passing the discharge stream from said primary clarifier through a secondary treater containing a biological growth;
   (d) passing the total discharge stream from said secondary treater to the final disposal stream;
   (e) passing the other portion of the discharge stream from said chamber containing a grid of plastic material through a final clarifier to remove a portion of the solids therefrom; and
   (f) passing the discharge stream from said final clarifier to said final disposal stream.

2. The method of claim 1 wherein steps (d) and (e) occur only when the inflow of waste material is in excess of that which can be adequately treated by serial flow through said plastic grid containing chamber, said primary clarifier, said secondary treater, and said final clarifier.

3. The method of claim 1 wherein steps (d) and (e) are accomplished by means of weir flow arrangements included in said plastic grid containing chamber and said secondary treater respectively.

4. The method of claim 1 wherein said waste material is, without prior settling, passed directly into the chamber containing the plastic grid.

5. The method of claim 1 wherein the streams discharged to said final disposal stream in steps (d) and (f) have a biological oxygen demand of no more than twenty percent of that of the untreated waste material entering the treating system under conditions where the total flow entering the system does not exceed six times the normal design flow rate.

6. Apparatus for treating flowable organic-containing waste material comprising:
   (a) a biological filter chamber containing a plastic filter media formed from alternate plain sheets and corrugated sheets connected to each other to provide channels therethrough for the flow of said waste material;
   (b) a primary clarifier vessel for the settlement of at least some of the solids present in said waste material;
   (c) a secondary treater vessel to further treat said waste material;
   (d) a final clarifier vessel to further settle some solid in said waste material;
   (e) connecting means between said biological filter chamber, said primary clarifier, said secondary treater, and said final clarifier for serial flow therebetween;
   (f) means for diverting a portion of said flow from said biological filter chamber directly to said final clarifier; and
   (g) means for diverting at least a portion of said flow from said secondary treater away from said final clarifier.

7. The apparatus of claim 6 wherein said means for diverting a portion of said flow from said biological filter chamber directly to said final clarifier includes a weir arrangement.

8. The apparatus of claim 6 wherein said means for diverting a portion of said flow from said biological filter chamber directly to said final clarifier includes a valve which is controlled by the flow from said filter chamber to said primary clarifier.

9. The apparatus of claim 6 wherein means for diverting at least a portion of said flow from said secondary treater away from said final clarifier includes a valve which is controlled by the flow diverted from said biological filter chamber directly to said final clarifier.

10. The apparatus of claim 6 including a grit chamber and means connecting said grit chamber to said biological filter chamber whereby said waste material is settled to remove some of the sand and dense inorganic solids before entering said biological filter chamber.

References Cited

UNITED STATES PATENTS

| | | | |
|---|---|---|---|
| 2,077,498 | 4/1937 | Streander | 210—253 |
| 3,269,542 | 8/1966 | Renzi et al. | 210—17 X |

MICHAEL E. ROGERS, *Primary Examiner.*